(12) United States Patent
Jang et al.

(10) Patent No.: US 8,575,815 B2
(45) Date of Patent: Nov. 5, 2013

(54) WINDING FRAME WITH MAGMATE AND STATOR CORE WITH THE SAME

(75) Inventors: Jeong Cheol Jang, Gwangju (KR); Kyoung Joo Lee, Gwangju (KR); Wang Gyu Jeong, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 0 days.

(21) Appl. No.: 13/422,543

(22) Filed: Mar. 16, 2012

(65) Prior Publication Data

US 2012/0175993 A1    Jul. 12, 2012

Related U.S. Application Data (63) Continuation of application No. PCT/KR2010/007310, filed on Oct. 23, 2010.

(30) Foreign Application Priority Data

Nov. 23, 2009   (KR) ........................ 10-2009-0113139

(51) Int. Cl.
    *H02K 1/06*    (2006.01)
(52) U.S. Cl.
    USPC ............................. 310/216.009; 310/216.001
(58) Field of Classification Search
    USPC .................... 310/71, 194, 216.009
    See application file for complete search history.

(56) References Cited

U.S. PATENT DOCUMENTS

| | | | | |
|---|---|---|---|---|
| 5,583,387 A | * | 12/1996 | Takeuchi et al. | 310/216.009 |
| 5,729,072 A | * | 3/1998 | Hirano et al. | 310/216.009 |
| 6,226,856 B1 | * | 5/2001 | Kazama et al. | 29/596 |
| 7,126,246 B2 | * | 10/2006 | Izumi et al. | 310/208 |
| 7,663,285 B2 | * | 2/2010 | Yumoto et al. | 310/194 |
| 8,018,115 B2 | * | 9/2011 | Lyle | 310/216.009 |
| 8,058,766 B2 | * | 11/2011 | Hoshino et al. | 310/208 |
| 8,450,898 B2 | * | 5/2013 | Sears et al. | 310/194 |
| 2006/0033395 A1 | * | 2/2006 | Izumi et al. | 310/208 |

FOREIGN PATENT DOCUMENTS

| | | |
|---|---|---|
| JP | 2005-269755 A | 9/2005 |
| JP | 2008-253133 A | 10/2008 |
| KR | 10-0558605 B1 | 3/2006 |
| KR | 20-2009-0007696 U | 7/2009 |
| KR | 10-2009-0104451 A | 10/2009 |

* cited by examiner

*Primary Examiner* — Thanh Lam
(74) *Attorney, Agent, or Firm* — Sherr & Jiang, PLLC (57) ABSTRACT

A stator core including at least two or more stator core-continuous bodies each formed by coupling at least two or more unit cores to each other, each unit core consisting of a tooth portion having a coupling slot and a coupling projection formed along both ends thereof and connected to adjacent unit core by means of a connection portion formed at each of both end portions of the tooth portion, wherein the at least two or more stator core-continuous bodies are fitting-connected to each other by means of the coupling slots formed at one side ends thereof and the coupling projections formed at the other side ends thereof to form the stator core having a round shape.

6 Claims, 11 Drawing Sheets

WINDING FRAME WITH MAGMATE AND STATOR CORE WITH THE SAME

CROSS REFERENCE TO PRIOR APPLICATIONS

This application claims the benefit under 35 U.S.C. §120 and §365(c) to a prior PCT International Patent Application No. PCT/KR2010/007310 (filed on Oct. 23, 2010 and designating the U.S.), which claims priority to Korean Patent Application No. 10-2009-0113139 (filed on Nov. 23, 2009), which are all hereby incorporated by reference in their entirety.

BACKGROUND

Generally, a motor used in an outdoor unit of an air conditioner includes a stator and a rotor. This stator is configured wherein coils are wound on a core (hereinafter referred to as 'stator core') having a plurality of teeth to cause a magnetic flux to be varied, thereby permitting the rotor to be rotated.

Figure 1:
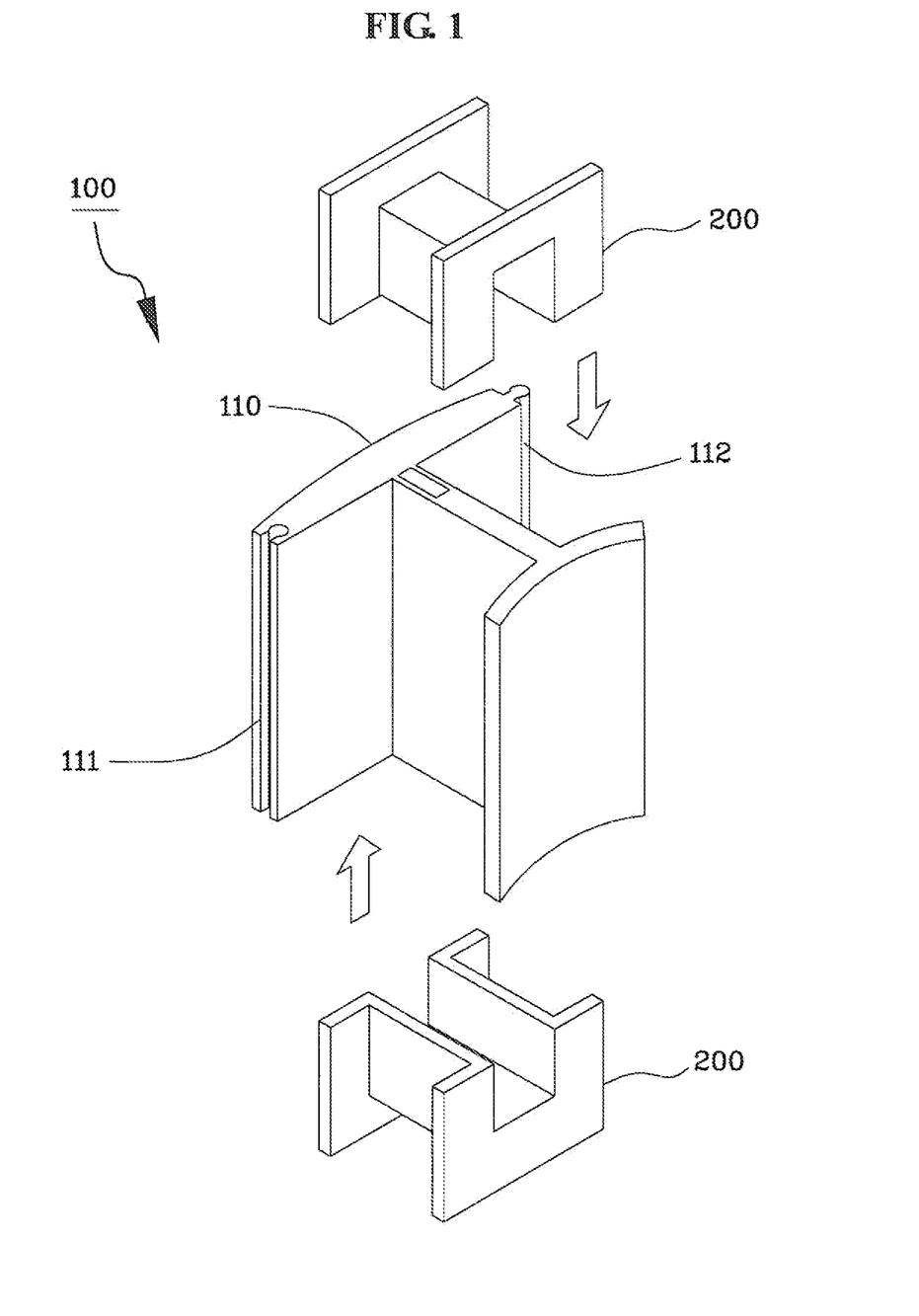
FIG. 1 is a conceptual view showing a structure of a conventional stator core wherein winding frames are coupled to a split core.
Figure 2:
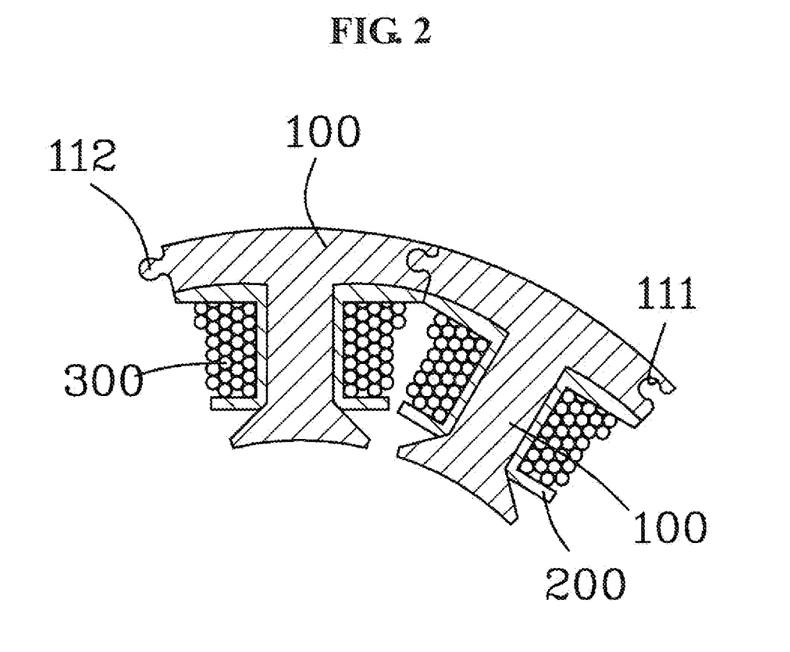
FIG. 2 is a sectional view showing two split cores are fitted to each other in the conventional stator core.
Figure 3:
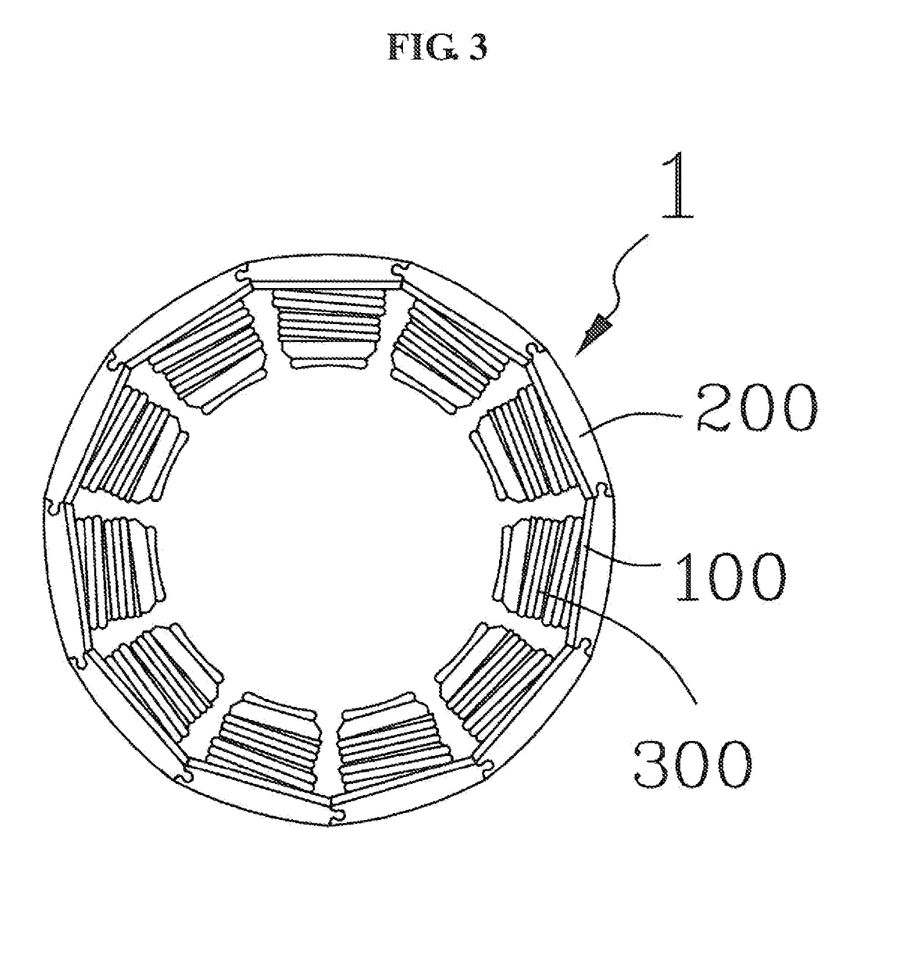
FIG. 3 is a plan view showing the conventional stator core made by coupling the split cores one after another.

As shown in FIG. 1, a conventional stator core is configured wherein a split core 100 made by punching a steel plate to a shape of 'T' is coupled to winding frames 200 serving as an insulator and having a coil to be wound thereon, and as shown in FIG. 2, next, a coupling slot 111 and a coupling projection 112 of the split core 100 are fitted to the corresponding coupling slot and projection of adjacent split core 100. When the split cores 100 are fitted one after another, as shown in FIG. 3, a round stator core is made. As shown in FIGS. 2 and 3, the coils (guide protrusion) 300 are wound on the winding frames 200.

According to the conventional stator core, however, the winding frames 200 are coupled to the split core 100, and next, the split core 100 is fitted to the adjacent split core 100 to form the round stator core, such that it is difficult to manufacture the stator core, which undesirably increases the manufacturing cost and time.

According to the conventional stator core, furthermore, so as to connect the ends of the respective coils wound on the winding frames, a plurality of coils are found one by one on the top portions of the stator core and connected correspondingly to respective phases, thereby making difficult to perform the connection process, and even after the connection, the connected coils are not organized well, thereby causing many inconveniences.

Accordingly, this inventors propose a novel stator core which has stator core-continuous bodies bent and connected to each other, without having split cores used in the conventional stator core, and which has winding frame-continuous bodies coupled to the stator core-continuous bodies, thereby reducing the manufacturing process and time and solving the above-mentioned problems caused during the coil connection.

SUMMARY

Accordingly, the present invention has been made in view of the above-mentioned problems occurring in the prior art, and it is an object of the present invention to provide a stator core that has stator core-continuous bodies configured to more easily manufacture the stator core.

It is another object of the present invention to provide a winding frame and a stator core having the winding frame that are configured to easily carry out the connection process of coils and to reduce the manufacturing cost and time of the stator core.

The above objects and other objects of the present invention will be easily achieved by a preferred embodiment of the present invention as will be described below.

To accomplish the above objects, according to an aspect of the present invention, there is provided a stator core including at least two or more stator core-continuous bodies each formed by coupling at least two or more unit cores to each other, each unit core consisting of a tooth portion having a coupling slot and a coupling projection formed along both ends thereof and connected to adjacent unit core by means of a connection portion formed at each of both end portions of the tooth portion, wherein the at least two or more stator core-continuous bodies are fitting-connected to each other by means of the coupling slots formed at one side ends thereof and the coupling projections formed at the other side ends thereof to form the stator core having a round shape.

According to the present invention, each stator core-continuous body is coupled on the top and underside thereof with a plurality of winding frames, each winding frame having an outer peripheral portion, a winding portion and an inner peripheral portion. Further, the outer peripheral portion of each winding frame has coil introducing parts through which a coil comes and goes from/to the winding portion, and has coil guides by which coils are not brought into contact with one another. Also, the outer peripheral portion of each winding frame has a PCB guide protrusion formed on the top portion thereof so as to guide PCB coupling. Also, the inner peripheral portion of each winding frame has a PCB coupling protrusion formed on the top portion thereof so as to guide the PCB coupling.

According to another aspect of the present invention, there is provided a winding frame including: an outer peripheral portion having a connection portion formed at each of both ends thereof; a winding portion; and an inner peripheral portion.

According to the present invention, desirably, the outer peripheral portion of the winding frame has at least one or more coil introducing parts and coil guides by which coils are not brought into contact with one another. Further, the outer peripheral portion of the winding frame has a PCB guide protrusion formed on the top portion thereof so as to couple a PCB thereto, and the inner peripheral portion of the winding frame has a PCB coupling protrusion formed on the top portion thereof so as to couple the PCB thereto.

According to yet another aspect of the present invention, a winding frame-continuous body having at least one or more winding frames connected one after another is coupled to the stator core-continuous body, and at least one or more outer peripheral portions of the winding frames have magmates disposed for coil connection.

According to still another aspect of the present invention, there is provided a method for manufacturing a stator core including the step of: punching an electrical steel plate to form a thin film type stator core-continuous body having at least two or more unit cores connected to each other; stacking the thin film type stator core-continuous body to make a stator core-continuous body; coupling a winding frame-continuous body to the top and underside of the stator core-continuous body, respectively; bending the stator core-continuous body to a half-round shape; and coupling the stator core-continuous body to another stator core-continuous body made by the above steps to form the stator core having a round shape.

The stator core according to the present invention has the following advantages:

Firstly, the two or more stator core-continuous bodies are bent and coupled to each other, without any adoption of the conventional split cores, such that a quantity of waste steel plates after punching can be reduced.

Secondly, the winding frame-continuous body is coupled to the stator core-continuous body, such that the manufacturing process and time of the stator core can be simple and shortened.

Thirdly, magmates are arranged on the winding frames, such that the connection and organization of coils can be carried out in a simple manner.

Fourthly, the PCB is coupled to the winding frames, such that the coupling is easy and firm.

DESCRIPTION

Hereinafter, an explanation on a stator core according to the present invention will be in detail given with reference to the attached drawings.

Figure 4:
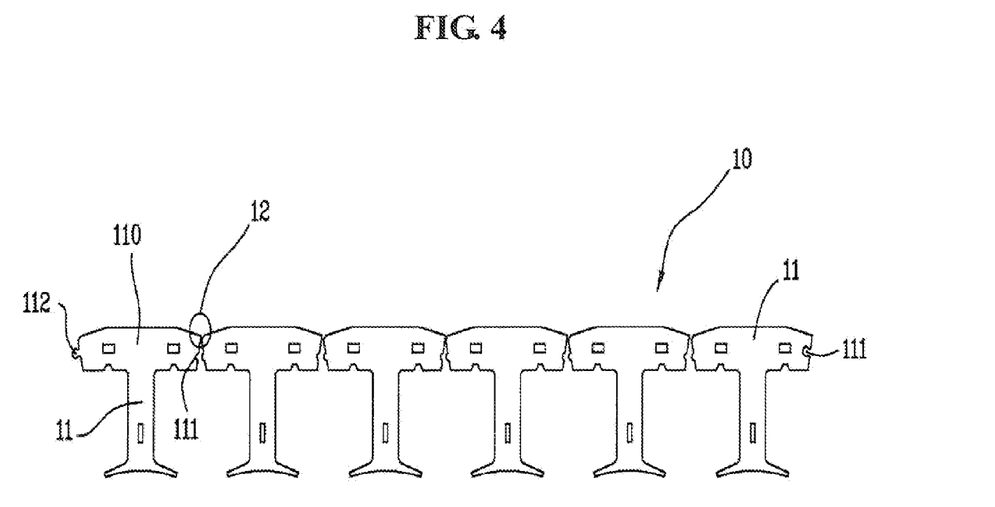
FIG. 4 is a plan view showing a stator core-continuous body used in a stator core according to the present invention.
Figure 5:
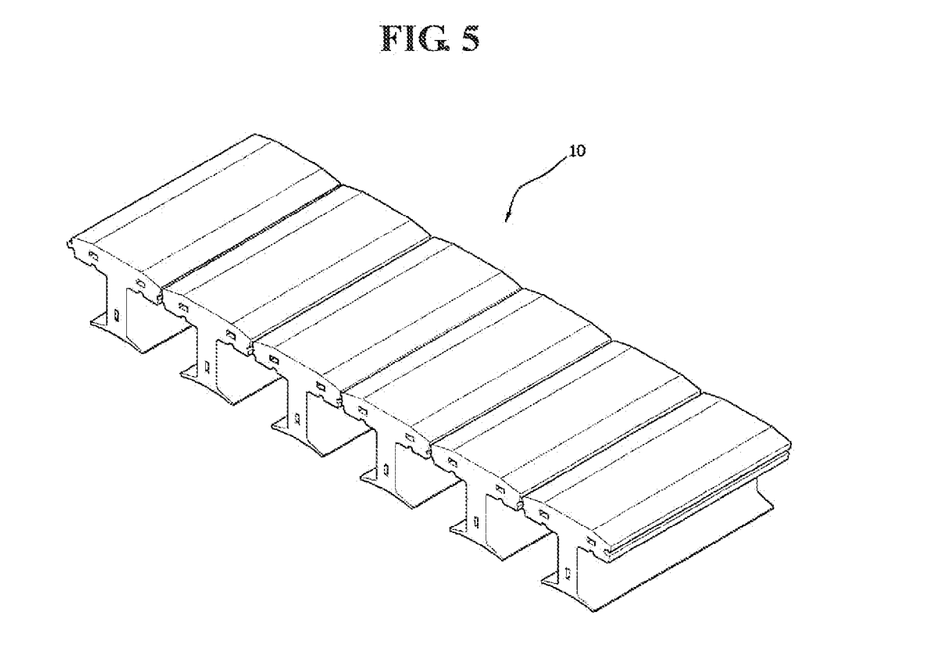
FIG. 5 is a perspective view showing the stator core-continuous body used in the stator core according to the present invention.

FIG. 4 is a plan view showing a stator core-continuous body used in a stator core according to the present invention, and FIG. 5 is a perspective view showing the stator core-continuous body.

As shown in FIGS. 4 and 5, the stator core according to the present invention is made by introducing a stator core-continuous body 10. According to the structure of the stator core-continuous body 10, a unit core 11 is coupled to another unit core 11 adjacent thereto by means of connection portions 12 formed at the ends of the top portions of a tooth 110 thereof. That is, a punching process for an electrical steel plate is carried out in the state where the adjacent unit cores 11 are connected one after another.

If the coupled unit cores 11 are punched and stacked one after another, the stator core-continuous body 10 as shown in FIG. 5 is made. Six unit cores 11 are connected in FIGS. 4 and 5, but the number of unit cores is not limited thereto. That is, the number of unit cores is appropriately determined upon the number of phases and poles of a motor. If the respective connection portions 12 of the stator core-continuous body 10 are bent inwardly, coupling projections 112 and coupling slots 111 of the adjacent unit cores 11 are fitted correspondingly to each other, such that the stator core-continuous body 10 has a half-round shape, as shown in FIG. 6.

Figure 6:
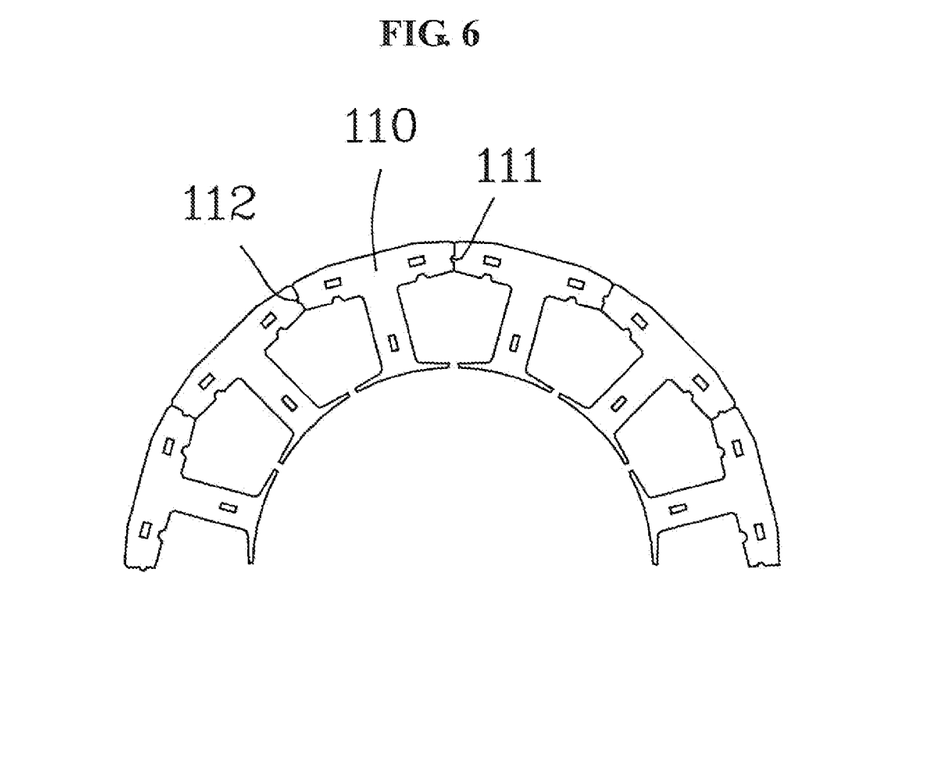
FIG. 6 is a conceptual view showing the stator core-continuous body bent to a half-round shape in the stator core according to the present invention.
Figure 7:
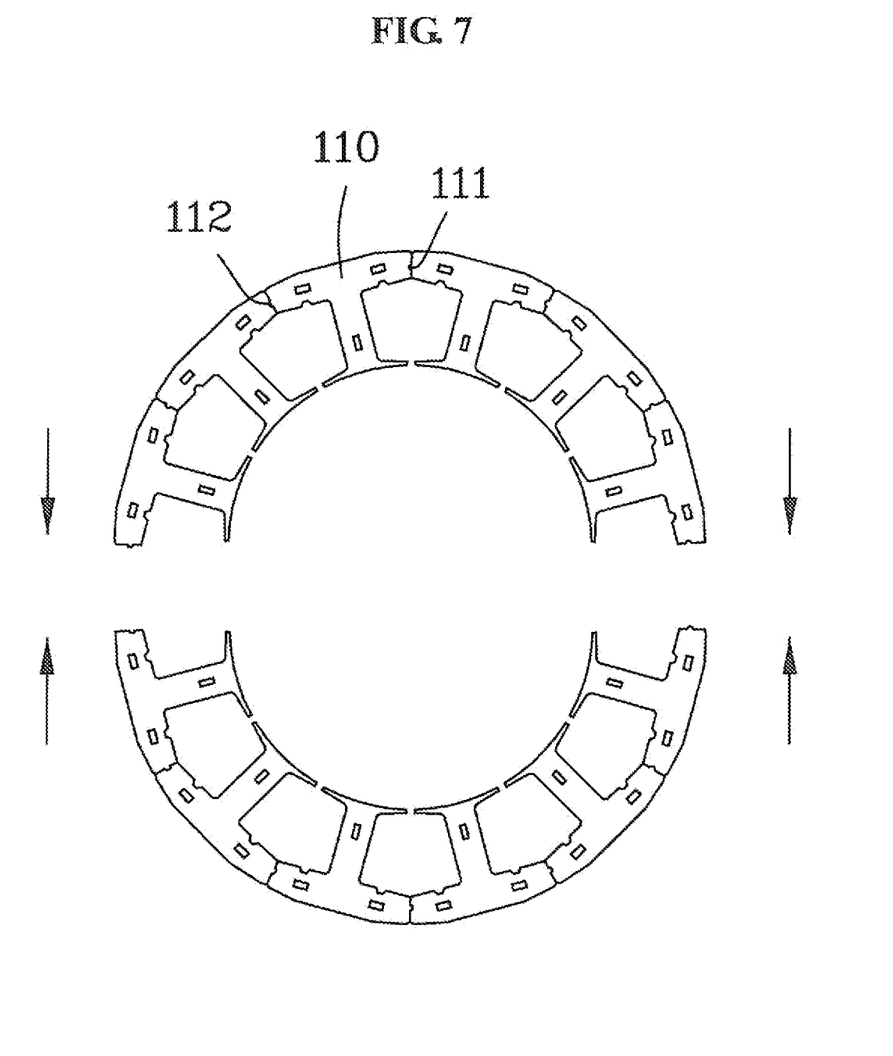
FIG. 7 is a conceptual view showing two stator core-continuous bodies coupled to each other to form the round stator core according to the present invention.

FIG. 6 is a conceptual view showing the stator core-continuous body bent to a half-round shape in the stator core according to the present invention, and FIG. 7 is a conceptual view showing the two stator core-continuous bodies coupled to each other to form the round stator core according to the present invention.

The conventional stator core is made by coupling twelve split cores one after another, but according to the present invention, the round stator core is made by connecting a pair of stator core-continuous bodies 10 each having six unit cores coupled one after another through the respective connection portions 12. This is well shown in FIG. 7.

The connection portions 12 as shown in FIG. 4 are formed on the end portions of the teeth 110 of the stator core-continuous body 10, but the positions of the connection portions 12 are not necessarily limited thereto. That is, if the stator core-continuous body 10 is bent to form the round stator core, the positions of the connection portions 12 can be freely varied.

Like this, the stator core according to the present invention is formed not by connecting the individual split cores as used in the conventional practice, but by connecting the stator core-continuous bodies 10, thereby carrying out the manufacturing process in simple and easy manners. Also, the stator core-continuous body 10 is punched to a continuous linear shape, as shown in FIG. 4, such that a quantity of waste steel plates can be decreased.

Figure 8:
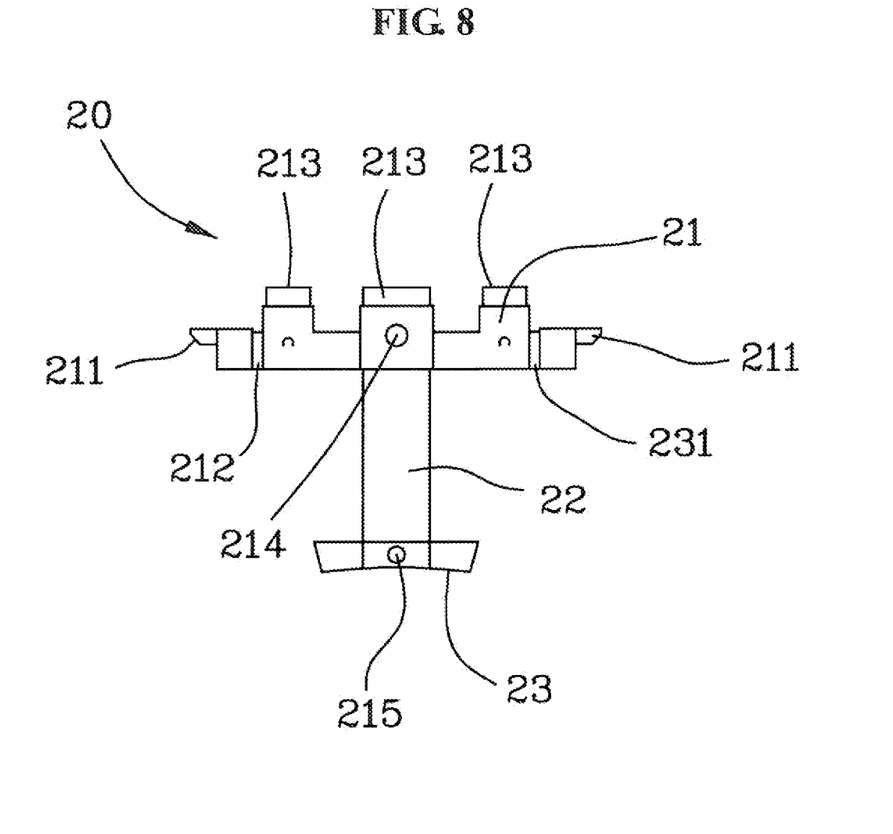
FIG. 8 is a plan view showing a winding frame according to the present invention.
Figure 9:
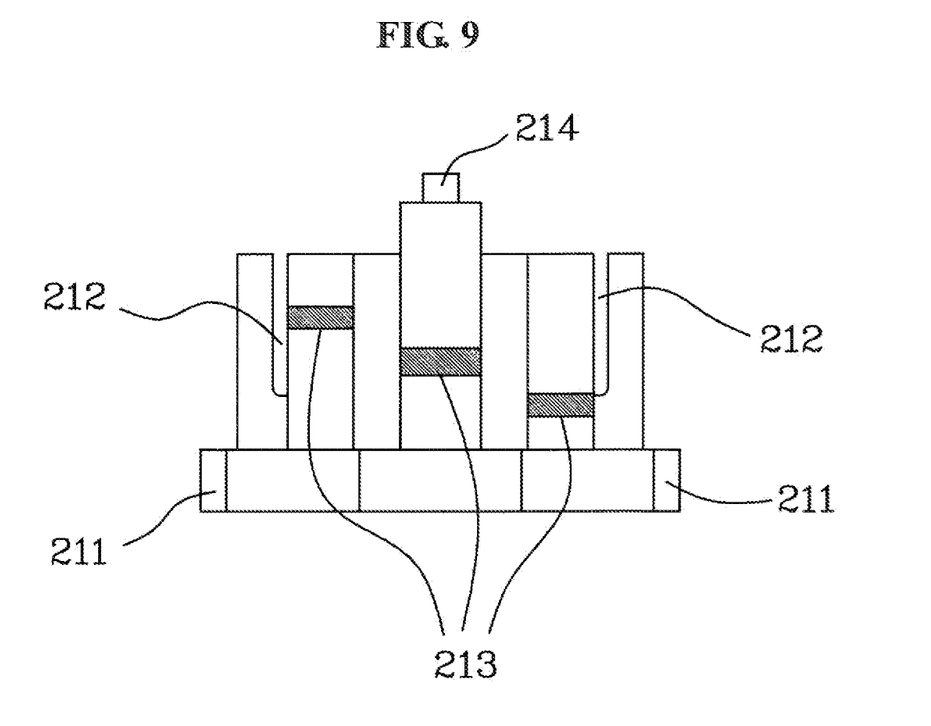
FIG. 9 is a side view showing the winding frame seen at the outer periphery thereof.

FIG. 8 is a plan view showing a winding frame according to the present invention, and FIG. 9 is a side view showing the winding frame seen at the outer periphery thereof.

As shown in FIG. 8, a winding frame 20 according to the present invention largely includes an outer peripheral portion 21, a winding portion 22 and an inner peripheral portion 23. The outer peripheral portion 21 and the winding portion 22 are coupled to the teeth portions of the stator core, and the winding portion 22 has the coil to be wound thereon.

Figure 10:
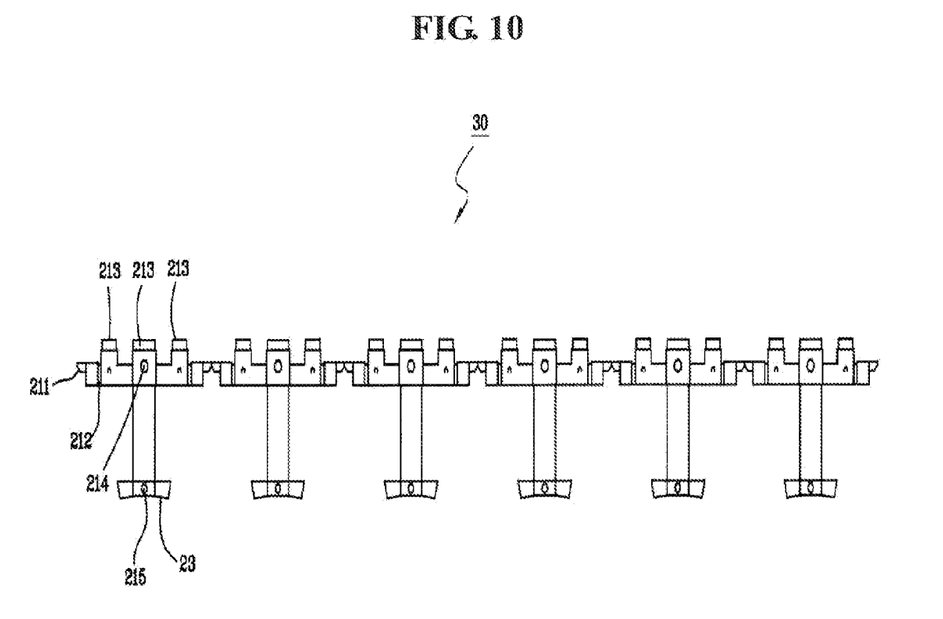
FIG. 10 is a plan view showing a winding frame-continuous body made by coupling the winding frames according to the present invention.

The outer peripheral portion 21 of the winding frame 20 has connection parts 211 formed at both ends thereof, and the connection parts 211 are formed for connecting adjacent winding frame to form a winding frame-continuous body 30 in a similar manner to the stator core-continuous body 10 as mentioned above. The winding frame-continuous body 30 is shown in FIG. 10.

A pair of coil introducing parts 212 is formed on the outer peripheral portion 21. The coil is introduced from the outside of the outer peripheral portion 21 toward the winding portion 22 through one side coil introducing part 212, and the coil from the winding portion 22 toward the outside of the outer peripheral portion 21 through the other side coil introducing part 212. In more detail, the coil to be wound on the stator core is introduced first toward the winding portion 22 through one side coil introducing part 212 so as to be wound on the winding frame 20 coupled to the teeth portions of the respective cores. Next, the coil introduced toward the winding portion 22 is wound by a predetermined number of times and is guided to the outside of the outer peripheral portion 21 through the other side coil introducing part 212.

On the other hand, at least one or more coil guides 213 are protrudedly formed on the outside of the outer peripheral portion 21. The coil guides 213 serve to guide the coils so that the coils are not to be brought into contact with one another when they are passed over. This will be easily understood through FIG. 11. Furthermore, the outer peripheral portion 21 has a PCB (Printed Circuit Board) guide protrusion 214 formed on the top portion thereof so as to easily and firmly couple a PCB for coil wiring thereto.

The winding portion 22 is a portion on which the coil is wound and serves to insulate from each of the teeth portions of the cores. Accordingly, the winding frame 20 is made of an insulator and desirably made through plastic molding. The inner peripheral portion 23 forms the inner peripheral surface of the stator core, and as one of the characteristics of the present invention, a PCB coupling protrusion 215 is formed on the top portion of the inner peripheral portion 23 in such a manner as to be inserted into the hole formed on the PCB when it is coupled to the PCB, thereby carrying out the firm coupling to the PCB.

FIG. 10 is a plan view showing a winding frame-continuous body made by coupling the winding frames according to the present invention.

As shown in FIG. 10, the winding frame-continuous body 30 is formed by connecting the plurality of winding frames 20 one after another by means of the connection portions 211. The winding frame-continuous body 30 is not formed necessarily with the six winding frames 20, as shown in FIG. 10, but in the same manner as the stator core-continuous body 10 as mentioned above, the number of winding frames 20 is appropriately varied in accordance with the poles, phases and capacities of the motor. According to the present invention, since the stator core-continuous body 10 is formed by coupling six unit cores 11 one after another, the winding frame-continuous body 30 is also formed by coupling six winding frames 20 one after another.

The winding frame-continuous body 30 is made by connecting six winding frames 20, as shown in FIG. 10. That is, if a mold for plastic molding is made, the mold has a shape having six winding frames connected one after another, such that the winding frame-continuous body 30 is made as a single product. The manufactured winding frame-continuous body 30 is coupled to the top and underside of the stator core-continuous body 10 as shown in FIGS. 4 and 5. The coupling manner is similar to that in the convention practice as shown in FIG. 1.

Next, an explanation on the process of manufacturing the stator core according to the present invention will be given.

First, an electrical steel plate is punched to the continuous linear shape as shown in FIG. 4. The punched thin film type stator core-continuous body is stacked to form the stator core-continuous body as shown in FIG. 5. Next, the winding frame-continuous body is coupled to the top and underside of the stator core-continuous body 10. The above-mentioned operation is repeated two times to make a pair of stator core-continuous bodies 10. The manufactured stator core-continuous bodies 10 are in the state of being coupled to the winding frames.

At this state, a winding operation on each winding frame is carried out. An explanation on the winding operation will be given below. When the winding operation is finished, next, the stator core-continuous body 10 is bent to a half-round shape as shown in FIG. 6 and is coupled to the corresponding stator core-continuous body. After coupling, the ends of the cores corresponding to respective phases are inserted into magmate ports, thereby completing the coil connection, and the wiring PCB is coupled on the winding frames 20.

In the state where the plurality of unit cores are connected, since the winding frames having the same number as the unit cores are coupled to the connected unit cores at the same time, the manufacturing process is more simple and easier when compared with the conventional process where the individual split cores are coupled to each other, and the manufacturing cost is lowered. Also, the PCB is firmly and easily coupled on the winding frames.

Figure 11:
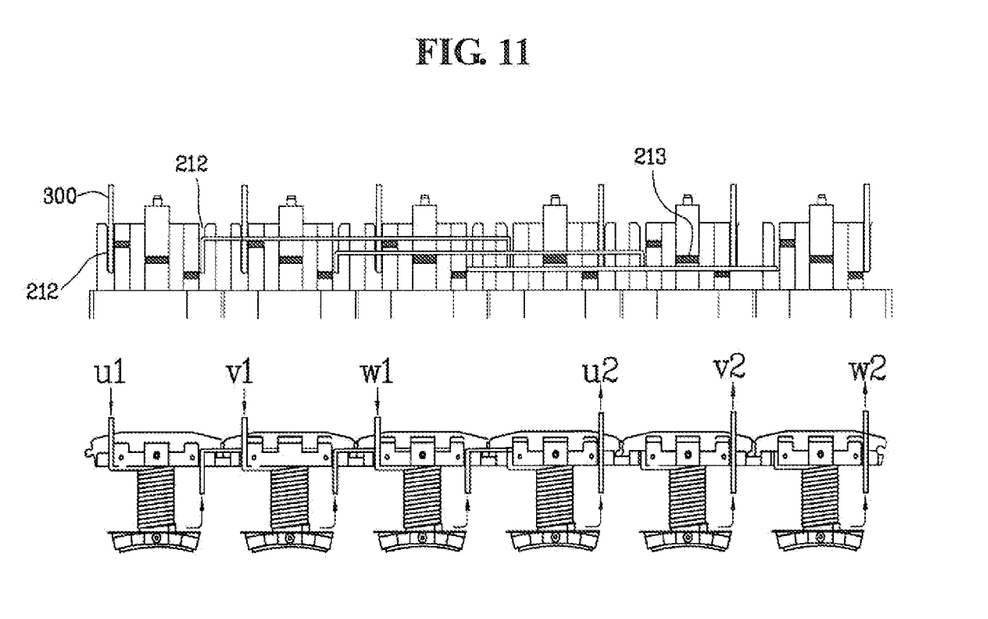
FIG. 11 is a conceptual view showing a coil winding state of the stator core according to the present invention.

FIG. 11 is a conceptual view showing a coil winding state of the stator core according to the present invention.

As shown in FIG. 11, the coils (guide protrusions) are wound in the state where the winding frames are coupled to the stator core-continuous body 10, and the connection of three phases of u, v and w is shown in FIG. 11.

As shown, the coil (guide protrusion) having the u phase is introduced to a first winding frame and is wound thereon (u1). After that, the coil is introduced to a fourth winding frame and is wound thereon (u2). In the same manner as mentioned above, the coil having the v phase is introduced to a second winding frame and is wound thereon (v1). After that, the coil is introduced to a fifth winding frame and is wound thereon (v2). Further, the coil having the w phase is introduced to a third winding frame and is wound thereon (w1). After that, the coil is introduced to a sixth winding frame and is wound thereon (w2). The three kinds of coils wound are organized by means of the coil guides 213 formed on the outside of the outer peripheral surface of each winding frame, such that they are not brought into contact with one another.

In the same manner as mentioned above, the coils on the other side stator core-continuous body (to which the winding frame is coupled) of the whole stator core-continuous bodies have the three phases of u, v and w. Even though not shown in FIG. 11, the coils are wound in the same manner as in one side stator core-continuous body and are connected in the order of u3, v3, w3, u4, v4 and w4. So as to connect the two stator core-continuous bodies by the respective phases, magmate ports are needed. That is, so as to connect the ends of u1 and u2 with the ends of u3 and u4, one two-port magmate is needed, and in the same manner as mentioned above, so as to the coils having the v and w phases are connected, two two-port magmates are needed. Accordingly, three two-port magmates are needed. Further, so as to connect neutral points to which the coils having the three phases of u, v and w are connected, one three-port magmate is needed. That is, in the structure where twelve winding frames are connected, three two-port magmates and one three-port magmate are needed. This will be discussed in more detail with reference to FIG. 12.

Figure 12:
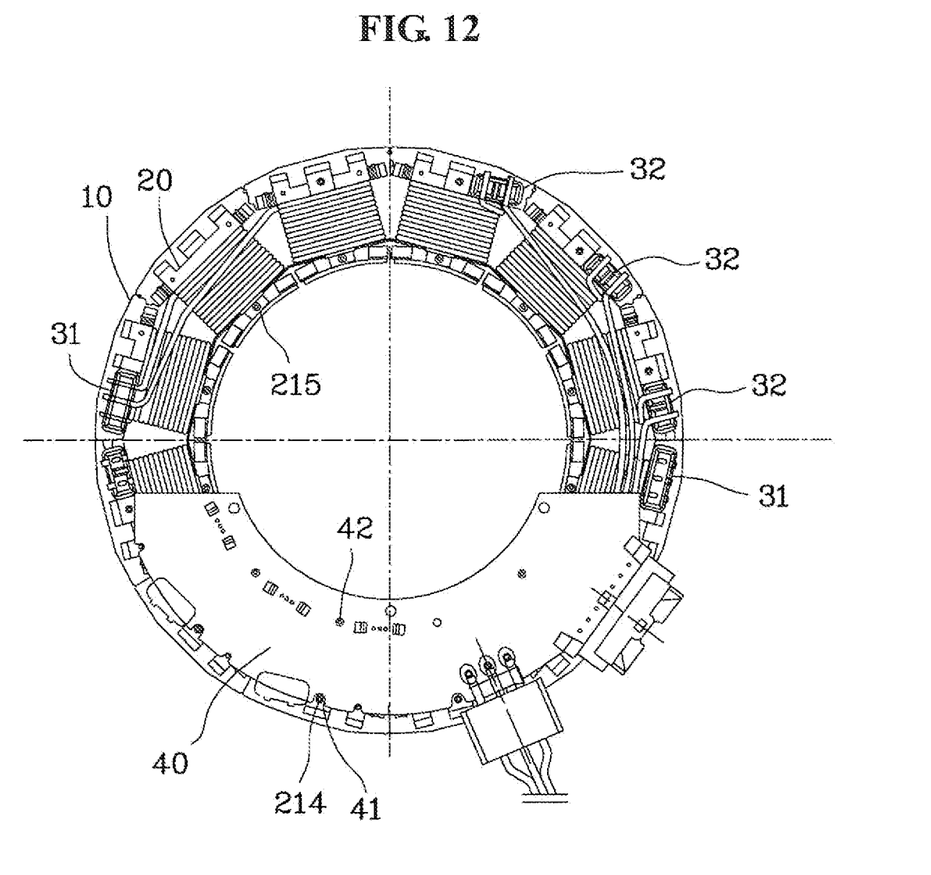
FIG. 12 is a plan view showing a connection state of the wound coils of the stator core according to the present invention.

FIG. 12 is a plan view showing a connection state of the wound coils of the stator core according to the present invention.

As shown in FIG. 12, a pair of stator core-continuous bodies is connected to form the whole stator core, and the PCB 40 is coupled to the stator core.

One three-port magmate 31 and three two-port magmates 32 are disposed on the upper portion of the round stator core. As mentioned above, one three-port magmate 31 is needed for the connection to the neutral points of the three phases of u, v and w, and three two-port magmates 32 are needed for the connection of the respective phases of u, v and w of the adjacent stator core-continuous body. The two-port and three-port magmates are disposed at the outer peripheral portion of the winding frames. It is desirable that the magmates are molded and made integrally with the winding frames, without any coupling to the winding frames through separate members. In this case, the magmates can be coupled to adjacent stator core-continuous body, while having a shape of one winding frame-continuous body, without having any separate mold. Accordingly, the magmates disposed on the upper round side as shown in FIG. 12 are disposed at the coil connection state, but those on the lower round side are disposed at an empty state without any connection.

If the coil connection on the magmates is finished, thus, the PCB 40 for the connection to external power is coupled to the top portions of the winding frames, and in this case, the PCB 40 has a plurality of PCB guide grooves 41 and a PCB coupling grooves 42 into which the PCB guide protrusions 214 and the PCB coupling protrusions 215 formed on the top portions of the winding frames are correspondingly inserted. Accordingly, the PCB can be more easily and firmly coupled to the top portions of the winding frames.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

According to the present invention, there is provided the stator core that includes the stator core-continuous body to reduce the manufacturing process and cost and that improves the structure of a winding frame to more easily carry out the organization and connection of a coil, such that the manufacturing cost of the motor can be substantially decreased.

The invention claimed is:

1. A stator core comprising:
    at least two or more stator core-continuous bodies each having at least two or more unit cores continuously formed as a unitary body,
    wherein each unit core includes a tooth portion having a coupling slot and a coupling projection formed along both ends thereof and each unit core is continuously connected to adjacent unit core without being separated from each other by means of a connection portion which is a continuous portion formed at each of both end portions of the tooth portion,
    wherein each stator core-continuous body is bent at each connection portion and the at least two or more stator core-continuous bodies are fitting-connected to each other by means of the coupling slots formed at one side ends thereof and the coupling projections formed at the other side ends thereof to form the stator core having a round shape.

2. The stator core according to claim 1, further comprising a plurality of winding frames coupled on a top and bottom of each stator core-continuous body, each winding frame having an outer peripheral portion, a winding portion and an inner peripheral portion.

3. The stator core according to claim 2, wherein the outer peripheral portion of each winding frame has coil introducing parts through which a coil comes and goes from/to the winding portion.

4. The stator core according to claim 2, wherein the outer peripheral portion of each winding frame has coil guides by which coils are not brought into contact with one another.

5. The stator core according to claim 2, wherein the outer peripheral portion of each winding frame has a PCB guide protrusion formed on the top portion thereof so as to couple a PCB for coil wiring thereto.

6. The stator core according to claim 2, wherein the inner peripheral portion of each winding frame has a PCB coupling protrusion formed on the top portion thereof so as to couple the PCB thereto.

* * * * *